(12) United States Patent
Viklund

(10) Patent No.: US 11,034,308 B2
(45) Date of Patent: Jun. 15, 2021

(54) BICYCLE FRAME CRADLE WITH FOLD-IN ANTI-SWAY DEVICE

(71) Applicant: Thule Sweden AB, Hillerstorp (SE)

(72) Inventor: Mark Viklund, New Milford, CT (US)

(73) Assignee: Thule Sweden AB, Hillerstorp (SE)

( * ) Notice: Subject to any disclaimer, the term of this patent is extended or adjusted under 35 U.S.C. 154(b) by 38 days.

(21) Appl. No.: 16/025,256

(22) Filed: Jul. 2, 2018

(65) Prior Publication Data

US 2020/0001798 A1  Jan. 2, 2020

(51) Int. Cl.
*B60R 9/10* (2006.01)

(52) U.S. Cl.
CPC ..................................... *B60R 9/10* (2013.01)

(58) Field of Classification Search
CPC .................................. B60R 9/10; B60R 9/00
See application file for complete search history.

(56) References Cited

U.S. PATENT DOCUMENTS

| 5,056,700 | A | * | 10/1991 | Blackburn | B60R 9/06 224/324 |
| 5,259,542 | A | | 11/1993 | Newbold et al. | |
| 5,435,472 | A | * | 7/1995 | Allen | B60R 9/06 224/314 |
| 5,476,201 | A | * | 12/1995 | Hall | B60R 9/10 224/492 |
| 5,938,093 | A | * | 8/1999 | Bloemer | B60R 9/048 224/504 |
| 6,386,407 | B1 | * | 5/2002 | Erickson | B60R 9/10 224/282 |
| 6,431,423 | B1 | * | 8/2002 | Allen | B60R 9/048 224/324 |
| 6,516,986 | B1 | * | 2/2003 | Lassanske | B60R 9/048 224/502 |

(Continued)

FOREIGN PATENT DOCUMENTS

| CA | 2169574 C | 7/2000 |
| CH | 665267 A5 | 4/1988 |

(Continued)

OTHER PUBLICATIONS

International Search Report and Written Opinion for International Application No. PCT/IB2019/051744, European Patent Office, Rijswijk, the Netherlands, dated May 7, 2019, 16 pages.

(Continued)

*Primary Examiner* — Derek J Battisti
(74) *Attorney, Agent, or Firm* — Sterne, Kessler, Goldstein & Fox P.L.L.C.

(57) ABSTRACT

A bicycle carrier includes a bicycle cradle. The bicycle cradle includes a through hole defining an inner surface and a slot through a portion of an outer surface of the bicycle cradle and a portion of the inner surface. The through hole is configured to receive a bicycle carrier support arm disposed therethrough. The slot is configured to allow a fastener to be coupled to the bicycle carrier support arm. An assembly for a bicycle carrier includes a bicycle cradle including a storage cavity and an anti-sway member coupled to the bicycle cradle and configured to secure a bicycle frame loaded onto the bicycle carrier. The anti-sway member is configured to be disposed at least partially within the storage cavity of the bicycle cradle in a storage configuration.

20 Claims, 14 Drawing Sheets

(56) References Cited

U.S. PATENT DOCUMENTS

| | | | |
|---|---|---|---|
| 6,616,023 B1* | 9/2003 | Dahl | B60R 9/048 224/324 |
| 6,988,645 B1* | 1/2006 | Nusbaum | B60R 9/048 224/324 |
| 7,213,731 B1* | 5/2007 | Kolda | B60R 9/048 224/42.39 |
| 7,469,808 B2* | 12/2008 | Morales | B60R 9/10 224/537 |
| 7,757,917 B2 | 7/2010 | Bogoslofski et al. | |
| 8,025,196 B2 | 11/2011 | Flaherty et al. | |
| 8,220,681 B2 | 7/2012 | Farber | |
| 8,602,279 B2* | 12/2013 | Sautter | B60R 9/06 224/495 |
| 9,307,795 B2* | 4/2016 | Wiedemann | F16B 7/044 |
| 2006/0249466 A1* | 11/2006 | Wang | B62H 3/02 211/17 |
| 2007/0057001 A1* | 3/2007 | Wang | B60R 9/06 224/536 |
| 2007/0235487 A1 | 10/2007 | Bogoslofski et al. | |
| 2010/0155444 A1* | 6/2010 | Pedrini | B60R 9/06 224/545 |
| 2012/0234883 A1 | 11/2012 | Sautter et al. | |
| 2015/0191128 A1* | 7/2015 | Liu | B60R 9/10 224/568 |
| 2017/0001573 A1* | 1/2017 | Inagaki | B60R 9/06 |

FOREIGN PATENT DOCUMENTS

| | | |
|---|---|---|
| CN | 201356088 Y | 12/2009 |
| DE | 4122823 A1 | 1/1993 |
| JP | 2009214647 A | 9/2009 |

OTHER PUBLICATIONS

First Office Action dated Jul. 24, 2015 in Chinese Patent Application No. 201210504703.9.

* cited by examiner

BICYCLE FRAME CRADLE WITH FOLD-IN ANTI-SWAY DEVICE

BACKGROUND

Field

The present disclosure relates to load carrier devices. More specifically, embodiments of the present disclosure relate to bicycle carrier devices, for example, bicycle cradles, with a fold-in anti-sway device.

Background

Devices for carrying equipment on a vehicle can be used to transport the equipment from one place to another. In some examples, the load carrier can be a bicycle carrier device, for example, a hang style bicycle carrier. The bicycle carrier can be secured to the vehicle safely and conveniently via a hitch, typically attached to the rear of the vehicle. However, as the vehicle accelerates, decelerates, and turns during transportation, a bicycle loaded on the bicycle carrier can sway or swing and become damaged. Further, a bicycle cradle holding the bicycle may slide along a bicycle carrier support arm axis or may need to be adjusted rotationally about the bicycle carrier support arm for proper securement.

BRIEF SUMMARY

In some embodiments, a bicycle carrier includes a bicycle cradle. In some embodiments, the bicycle cradle includes a through hole defining an inner surface. In some embodiments, the through hole is configured to receive a bicycle carrier support arm disposed therethrough. In some embodiments, the bicycle cradle includes a slot through a portion of an outer surface of the bicycle cradle and a portion of the inner surface. In some embodiments, the slot is configured to allow a fastener to be coupled to the bicycle carrier support arm. In some embodiments, the fastener is a screw configured to be fastened to the bicycle carrier support arm.

In some embodiments, the slot is a radial slot. In some embodiments, the radial slot extends about 90 degrees along the outer surface of the bicycle cradle and is configured to allow the bicycle cradle to rotate about 90 degrees about the bicycle carrier support arm when the fastener is disposed in the radial slot. In some embodiments, the bicycle carrier further includes a thermoplastic elastomer insert disposed on a portion of the inner surface and configured to increase the coefficient of friction between the bicycle cradle and the bicycle carrier support arm. In some embodiments, the bicycle cradle includes a thermoplastic elastomer covering disposed on a portion of the outer surface of the bicycle cradle and configured to increase the coefficient of friction between the bicycle cradle and a bicycle frame loaded onto the bicycle cradle.

In some embodiments, the bicycle carrier further includes an anti-sway member coupled to the bicycle cradle. In some embodiments, the anti-sway member is pivotably coupled to the bicycle cradle by a pin.

In some embodiments, an assembly for a bicycle carrier includes a bicycle cradle including a storage cavity and an anti-sway member coupled to the bicycle cradle and configured to secure a bicycle frame loaded onto the bicycle carrier. In some embodiments, the anti-sway member is configured to be disposed at least partially within the storage cavity of the bicycle cradle in a storage configuration.

In some embodiments, the anti-sway member is pivotably coupled to the bicycle cradle by a pin. In some embodiments, the anti-sway member is configured to rotate about 120 degrees about the pin. In some embodiments, the bicycle cradle further includes a locking mechanism configured to secure the anti-sway member in the storage configuration. In some embodiments, the locking mechanism is a tab protruding from the storage cavity providing a snap-fit connection with an end of the anti-sway member. In some embodiments, an outer surface of the anti-sway member is concave. In some embodiments, in the storage configuration a majority of the anti-sway member is disposed within the storage cavity.

In some embodiments, the assembly further includes a thermoplastic elastomer insert disposed on a portion of an outer surface of the anti-sway member and configured to increase the coefficient of friction between the anti-sway member and a bicycle frame contacting the anti-sway member. In some embodiments, the assembly further includes a transverse slot through the anti-sway member configured to receive a strap.

In some embodiments, a bicycle carrier includes a bicycle cradle and a first strap. In some embodiments, the bicycle cradle includes a through hole defining an inner surface and a transverse slot through the bicycle cradle. In some embodiments, the through hole is configured to receive a bicycle carrier support arm disposed therethrough. In some embodiments, the first strap is configured to extend through the transverse slot of the bicycle cradle and around a bicycle frame disposed on the bicycle cradle.

In some embodiments, the bicycle carrier further includes an anti-sway member coupled to the bicycle cradle and configured to reduce movement of a bicycle loaded onto the bicycle carrier. In some embodiments, the anti-sway member is pivotably coupled to the bicycle cradle by a pin. In some embodiments, the anti-sway member includes a transverse slot through the anti-sway member. In some embodiments, the transverse slot of the anti-sway member is parallel to the through hole. In some embodiments, the bicycle carrier further includes a second strap configured to extend through the transverse slot of the anti-sway member and around a bicycle frame abutting the anti-sway member.

In some embodiments, the transverse slot of the bicycle cradle is parallel to the through hole. In some embodiments, the transverse slot of the bicycle cradle includes a first groove and the first strap includes a first rail disposed on a first side of the first strap. In some embodiments, the first rail is configured to extend through the first groove. In some embodiments, the transverse slot of the bicycle cradle includes a second groove and the first strap includes a second rail disposed on the first side of the first strap. In some embodiments, the second rail is configured to extend through the second groove. In some embodiments, the second rail is parallel to the first rail.

In some embodiments, the first strap includes a first buckle disposed at a first end of the first strap and configured to receive and secure a toothed side of the first strap. In some embodiments, the first buckle includes a spring-loaded tab. In some embodiments, the first buckle includes a first groove and the first strap includes a first rail disposed on a first side of the first strap. In some embodiments, the first rail is configured to extend through the first groove of the first buckle.

In some embodiments, an assembly for a bicycle carrier includes a bicycle cradle, a buckle, and a strap configured to be coupled to the buckle. In some embodiments, the buckle includes a first groove and the strap includes a first rail disposed on a first side of the strap. In some embodiments, the first rail is configured to extend through the first groove of the buckle.

In some embodiments, the buckle includes a spring-loaded tab configured to secure a toothed side of the strap. In some embodiments, the buckle includes a second groove and the strap includes a second rail disposed on the first side of the strap and parallel to the first rail. In some embodiments, the second rail is configured to extend through the second groove of the buckle. In some embodiments, the buckle is disposed at a distal end of the strap. In some embodiments, the buckle is disposed on the bicycle cradle.

In some embodiments, a method of securing a bicycle to a bicycle carrier includes loading a bicycle frame on the bicycle cradle, and securing a first strap coupled to the bicycle cradle around the bicycle frame disposed on the bicycle cradle. In some embodiments, the method includes connecting the bicycle cradle to the bicycle carrier support arm by coupling a fastener to the bicycle carrier support arm through a slot through a portion of the outer surface of the bicycle cradle. In some embodiments, securing the first strap includes disposing the first strap through a transverse slot of the bicycle cradle. In some embodiments, securing the first strap includes extending the first strap through a first buckle. In some embodiments, the method further includes securing the bicycle frame to an anti-sway member coupled to the bicycle cradle by securing a second strap coupled to the anti-sway member around the bicycle frame. In some embodiments, securing the second strap includes disposing the second strap through a transverse slot of the anti-sway member. In some embodiments, securing the second strap coupled to the anti-sway member includes disposing the second strap through a second buckle.

BRIEF DESCRIPTION OF THE DRAWINGS

The accompanying drawings, which are incorporated herein and form a part of the specification, illustrate the embodiments and, together with the description, further serve to explain the principles of the embodiments and to enable a person skilled in the relevant art(s) to make and use the embodiments.

Figure 1:
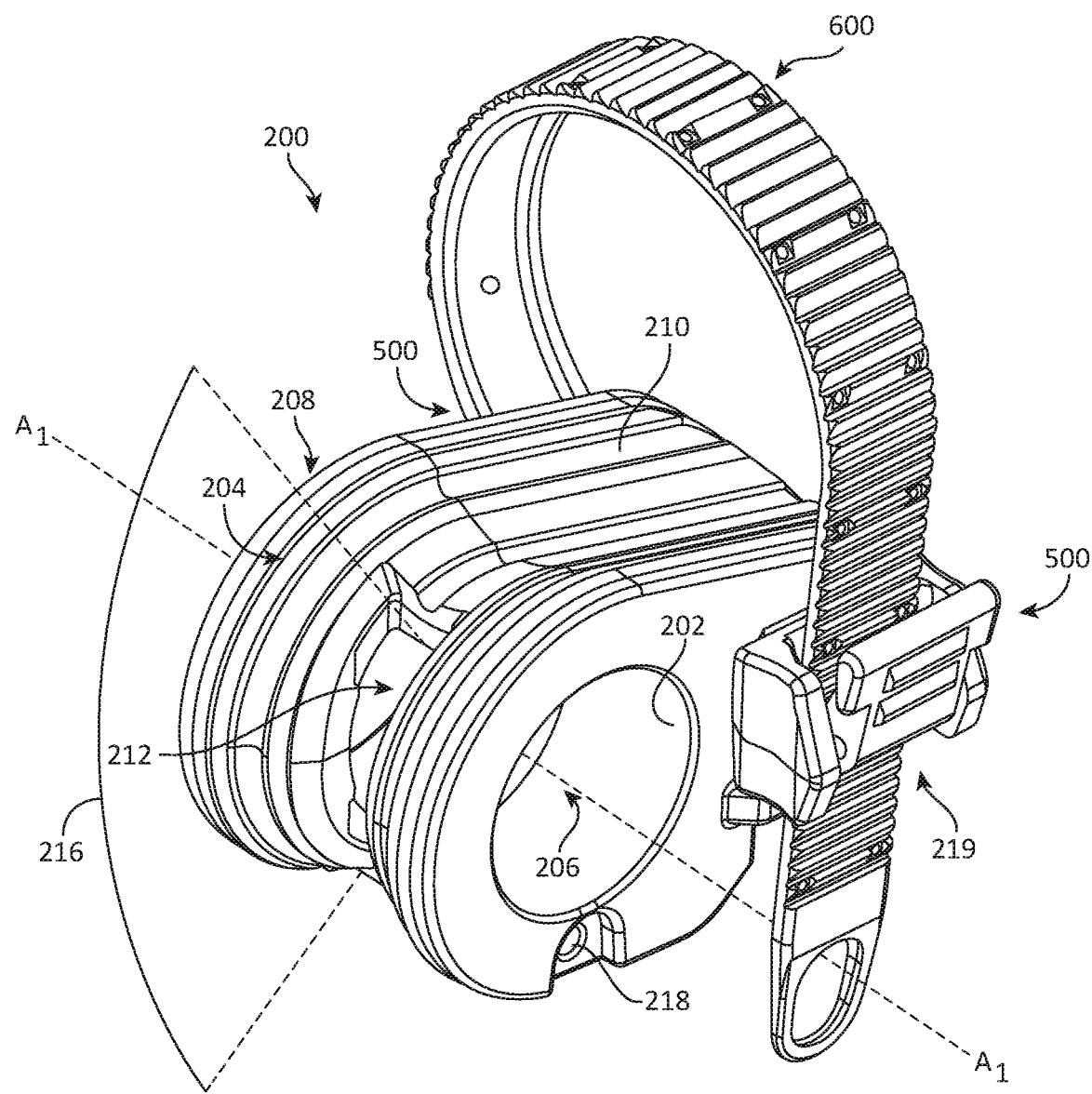
FIG. 1 illustrates a perspective view of a bicycle cradle, according to an embodiment.

The features and advantages of the embodiments will become more apparent from the detailed description set forth below when taken in conjunction with the drawings, in which like reference characters identify corresponding elements throughout. In the drawings, like reference numbers generally indicate identical, functionally similar, and/or structurally similar elements.

DETAILED DESCRIPTION

Embodiments of the present disclosure are described in detail with reference to embodiments thereof as illustrated in the accompanying drawings. References to "one embodiment," "an embodiment," "some embodiments," etc., indicate that the embodiment(s) described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The following examples are illustrative, but not limiting, of the present embodiments. Other suitable modifications and adaptations of the variety of conditions and parameters normally encountered in the field, and which would be apparent to those skilled in the art, are within the spirit and scope of the disclosure.

Embodiments of the bicycle cradle 200, anti-sway member 300, assembly 400, buckle 500, strap 600, and strap assembly 700 disclosed herein can be used with a load carrier 100, for example, but not limited to, a bicycle carrier. More specifically, the load carrier 100 can be a hang style bicycle carrier, which can be attached, for example, to a hitch receiver of a vehicle or a trunk of a vehicle. The bicycle carrier can be configured to carry one, two, three, or more bicycles.

Load carriers described herein can have one or more devices to secure a bicycle. Using multiple securement mechanisms provides redundancy to decrease the likelihood of the loaded bicycle swaying or swinging during transportation and becoming damaged. For example, a securement mechanism, such as a bicycle cradle with a strap, can provide appropriate support to a bicycle frame (e.g., to a top tube of the frame) to ensure proper securement and reduce swaying or swinging of the loaded bicycle during acceleration, deceleration, or turning of the vehicle during transportation. Additionally, a bicycle cradle can include an anti-sway member with a second strap coupled to the anti-sway member for additional securement of the bicycle frame (e.g., at the seat tube) during transportation. Also, the anti-sway member can be pivotably coupled to the bicycle cradle for easy fold-in storage in an interior cavity of the bicycle cradle when not in use.

In some embodiments of the present disclosure, a load carrier includes an assembly including a bicycle cradle and an anti-sway member coupled to the bicycle cradle. The anti-sway member is pivotably coupled to the bicycle cradle so that the anti-sway member can be rotated and secured to a bicycle frame or stored in an interior cavity of the bicycle cradle by a locking mechanism. The anti-sway member adds additional securement and stability to a loaded bicycle during transportation. This allows the user to easily and confidently secure a bicycle frame to the load carrier and reduce damage to the bicycle or vehicle during transportation. Also, the present disclosure provides embodiments of a bicycle cradle with a slot for securing a fastener to a bicycle carrier support arm of the load carrier. The slot allows for rotation of the bicycle cradle around the bicycle carrier support arm until a user tightens the fastener. Further, the present disclosure provides embodiments of a bicycle cradle with a transverse slot through the bicycle cradle for securing a bicycle frame with a strap extending through the transverse slot. The transverse slot can include a first groove and a second groove which can correspond to a first rail and a second rail, respectively, of the strap. Furthermore, the present disclosure provides embodiments of a strap assembly for a load carrier, where a strap can include an interlocking buckle. The strap can include a first rail and a second rail which correspond to a first groove and a second groove, respectively, on the buckle for ease of use and better securement.

Figure 5:
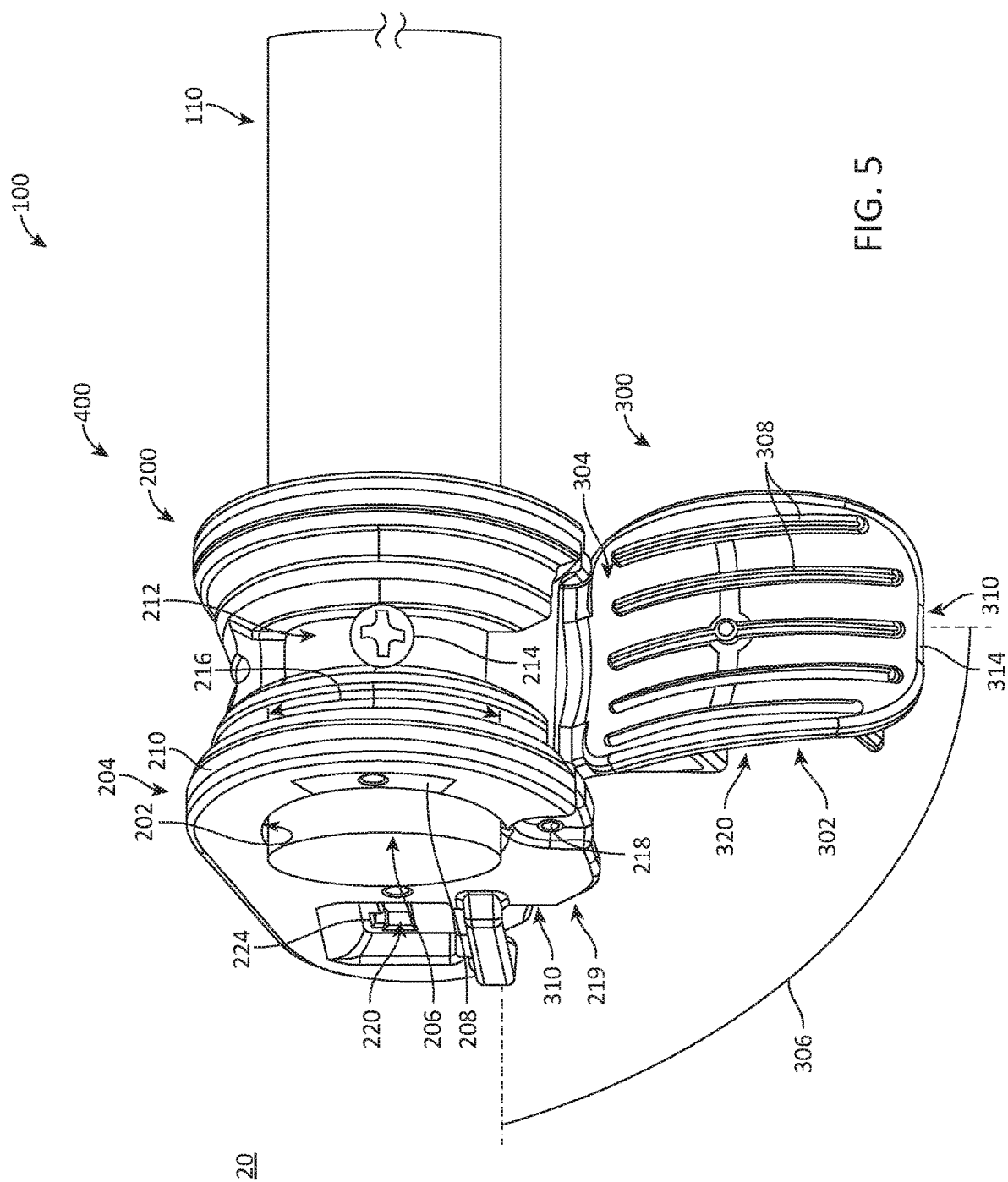
FIG. 5 illustrates a perspective view of a bicycle carrier with an assembly in an unlocked configuration, according to an embodiment.
Figure 9:
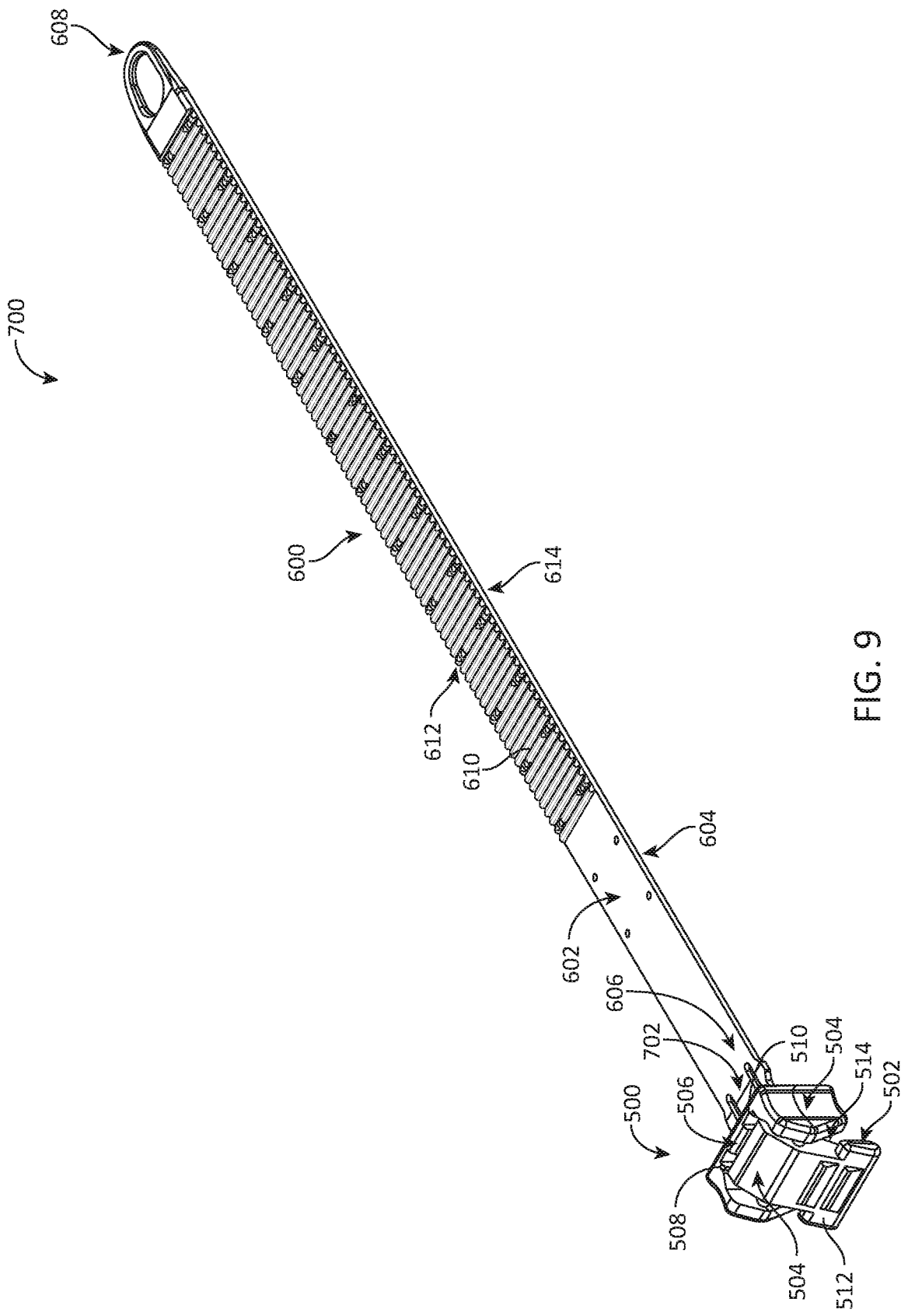
FIG. 9 illustrates a front perspective view of a strap assembly, according to an embodiment.
Figure 14:
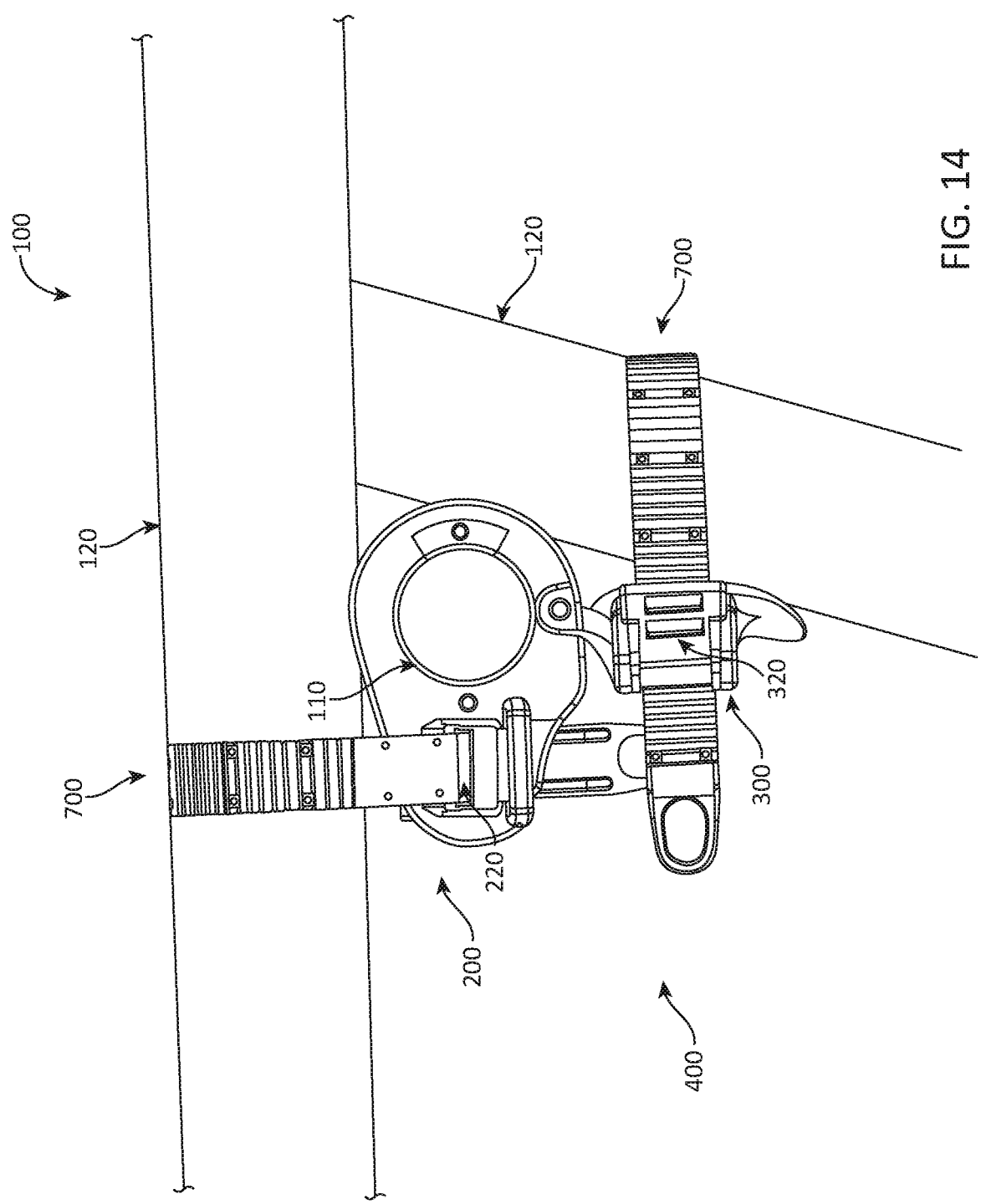
FIG. 14 illustrates a side view of a bicycle carrier with a secured bicycle frame, according to an embodiment.

By way of example, FIGS. 5 and 14 illustrate load carrier 100 with assembly 400. Assembly 400 includes bicycle cradle 200 and anti-sway member 300 coupled to bicycle cradle 200. FIGS. 5 and 14 show anti-sway member 300 in unlocked configuration 20 (also referred to as a free configuration). In some embodiments, load carrier 100 can include bicycle carrier support arm 110. Generally, bicycle carrier support arm 110 is a resilient material, for example, but not limited to, aluminum or titanium. In some embodiments, assembly 400 is attached to bicycle carrier support arm 110. As shown, for example in FIG. 5, assembly 400 can be attached to bicycle carrier support arm 110 by fastener 214. In some embodiments, load carrier 100 can have bicycle frame 120 disposed on assembly 400. In some embodiments, as shown in FIG. 14, bicycle frame 120 can be secured by strap assembly 700 coupled to bicycle cradle 200 and/or strap assembly 700 coupled to anti-sway member 300. As shown, for example in FIG. 9, strap assembly 700 can include buckle 500 and strap 600. In some embodiments, load carrier 100 can be configured to carry one, two, three, four, five, or more bicycles. For example, bicycle carrier support arm 110 can include one or more assemblies 400 or bicycle cradles 200 to secure one or more bicycle frames 120.

FIG. 1 illustrates an embodiment of bicycle cradle 200. Bicycle cradle 200 is configured to reduce movement of a bicycle loaded onto bicycle carrier 100. As shown, for example, in FIG. 1, bicycle cradle 200 can include inner surface 202, outer surface 204, through hole 206, and slot 212. Through hole 206 defines inner surface 202 and extends through bicycle cradle 200 along through hole axis A1. In some embodiments, through hole 206 can be configured to receive, as shown, for example, in FIG. 4, bicycle carrier support arm 110. In some embodiments, bicycle cradle 200 can be made of a rigid material, for example, polymers (e.g., plastic, polytetrafluoroethylene, polyoxymethylene, phenolics, acetals, nylon, etc.), metals (e.g., aluminum, titanium, etc.), or other similar rigid machinable material.

In some embodiments, as shown in FIG. 1, outer surface 204 of bicycle cradle 200 can include covering 210 disposed over all or a portion of outer surface 204. For example, covering 210 can be a thermoplastic elastomer (TPE) disposed on a portion of outer surface 204. In some embodiments, covering 210 can be any material that increases the coefficient of friction between bicycle cradle 200 and a bicycle frame, for example, a polymer or rubber material. In some embodiments, covering 210 can include a plurality of covering portions.

Figure 2:
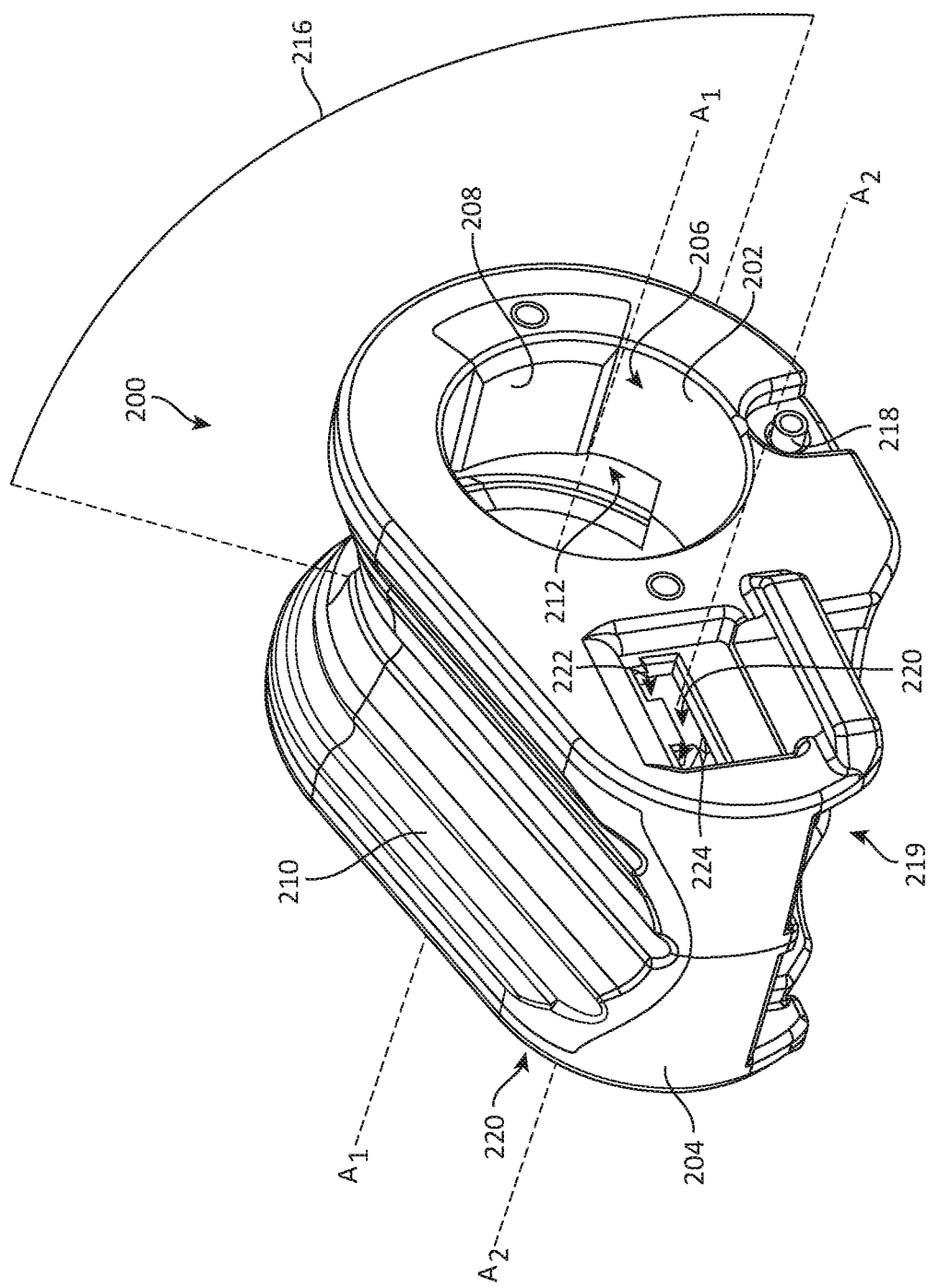
FIG. 2 illustrates a perspective view of a bicycle cradle, according to an embodiment.

In some embodiments, as shown in FIGS. 1 and 2, inner surface 202 defined by through hole 206 can include insert 208. For example, insert 208 can be a TPE disposed on a portion of inner surface 202. In some embodiments, insert 208 can be any material that increases the coefficient of friction between bicycle cradle 200 and bicycle carrier support arm 110, for example, a polymer or rubber material. In some embodiments, as shown in FIG. 2, insert 208 can extend radially inward from inner surface 202. In some embodiments, bicycle cradle 200 can include a plurality of inserts 208 on inner surface 202. In some embodiments, insert 208 can be disposed on all of inner surface 202.

Figure 4:
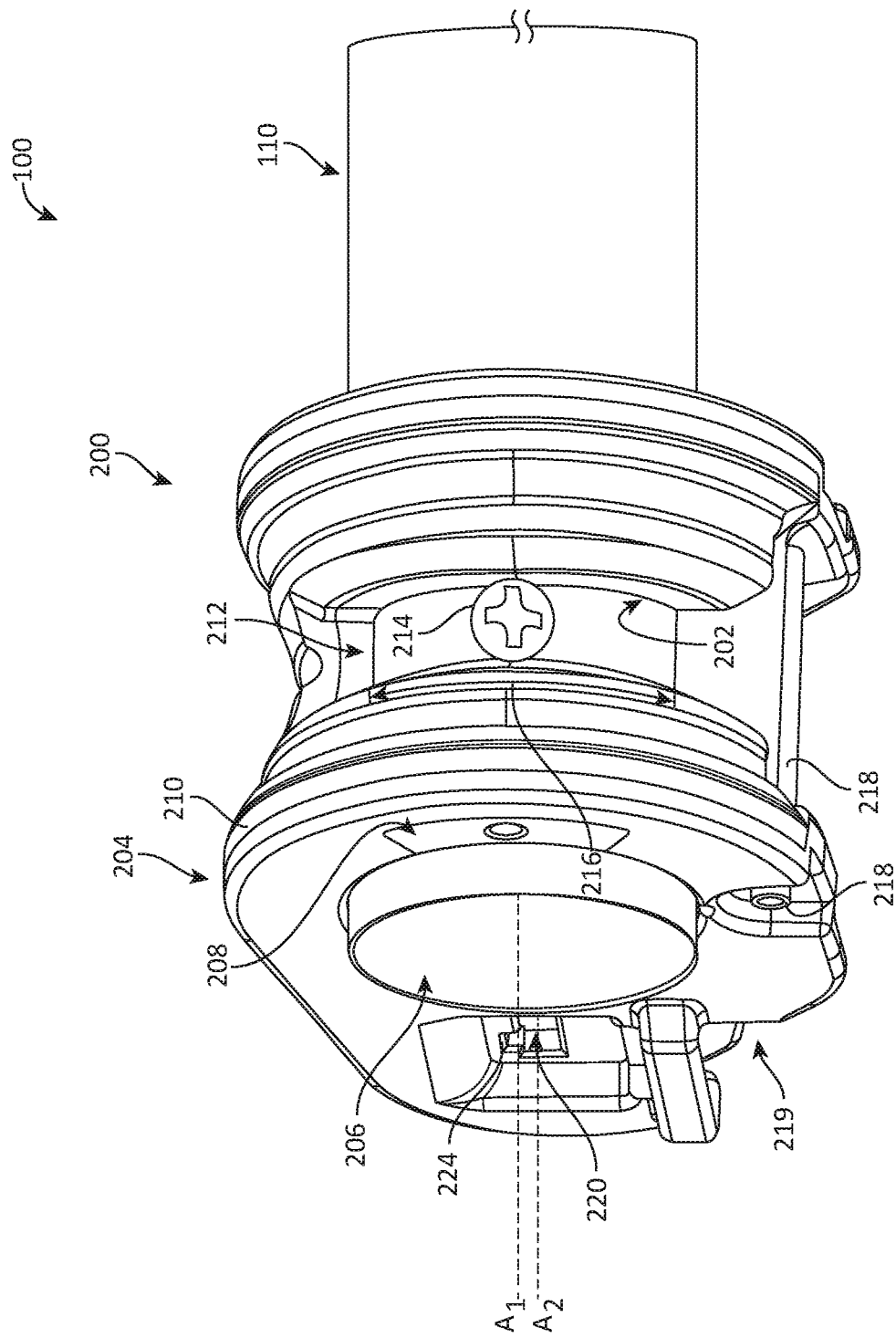
FIG. 4 illustrates a perspective view of a bicycle carrier with a bicycle cradle, according to an embodiment.

Slot 212 can be formed through a portion of outer surface 204 and a portion of inner surface 202 of bicycle cradle 200. In some embodiments, as shown in FIG. 4, slot 212 can be configured to allow fastener 214 to be coupled to bicycle carrier support arm 110. For example, fastener 214 can be a screw. In some embodiments, as shown in FIG. 1, slot 212 can be a radial slot. For example, slot 212 can radially extend about 90 degrees (as shown by arc 216) along outer surface 204. In some embodiments, slot 212 can radially extend about 60 degrees to 120 degrees along outer surface 204. In some embodiments, slot 212 can radially extend about 70 degrees to 110 degrees along outer surface 204. In some embodiments, slot 212 can allow bicycle cradle 200 to rotate about 90 degrees about bicycle carrier support arm 110 when fastener 214 is disposed in slot 212. For example, bicycle cradle 200 can be rotated to adjust an angle between outer surface 204, for example, covering 210, and bicycle frame 120. In some embodiments, fastener 214 is configured to reduce axial movement of the bicycle cradle 200 along bicycle carrier support arm 110. FIG. 4 illustrates an embodiment of bicycle carrier 100 with bicycle cradle 200 secured to bicycle carrier support arm 110. In some embodiments, bicycle cradle 200 can be fastened to bicycle carrier support arm 110 through slot 212 via fastener 214 over about a 90 degree arc 216 of bicycle cradle 200 about through hole axis A1.

Figure 3:
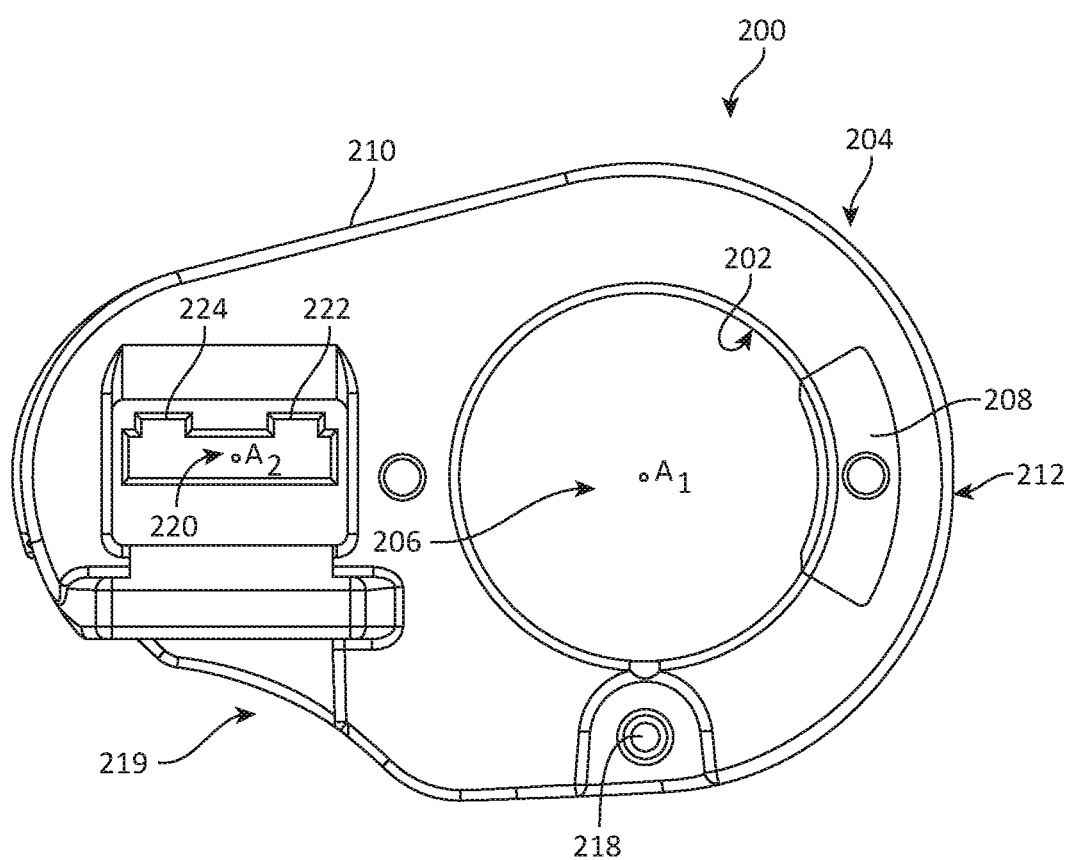
FIG. 3 illustrates a side view a bicycle cradle, according to an embodiment.

In some embodiments, as shown in FIGS. 2 and 3, bicycle cradle 200 can include transverse slot 220 that extends through bicycle cradle 200. In some embodiments, transverse slot axis A2 can be parallel to through hole axis A1. As shown, for example, in FIG. 3, in some embodiments, transverse slot 220 can include first groove 222 and optionally second groove 224. In some embodiments, as shown in FIG. 3, first and second grooves 222, 224 can have a quadrilateral cross-section. In some embodiments, transverse slot 220 can be configured to receive strap assembly 700 having strap 600 and buckle 500. For example, strap 600 can extend through transverse slot 220 of bicycle cradle 200, with first rail 612 and second rail 614 extending through first groove 222 and second groove 224, respectively.

Figure 10:
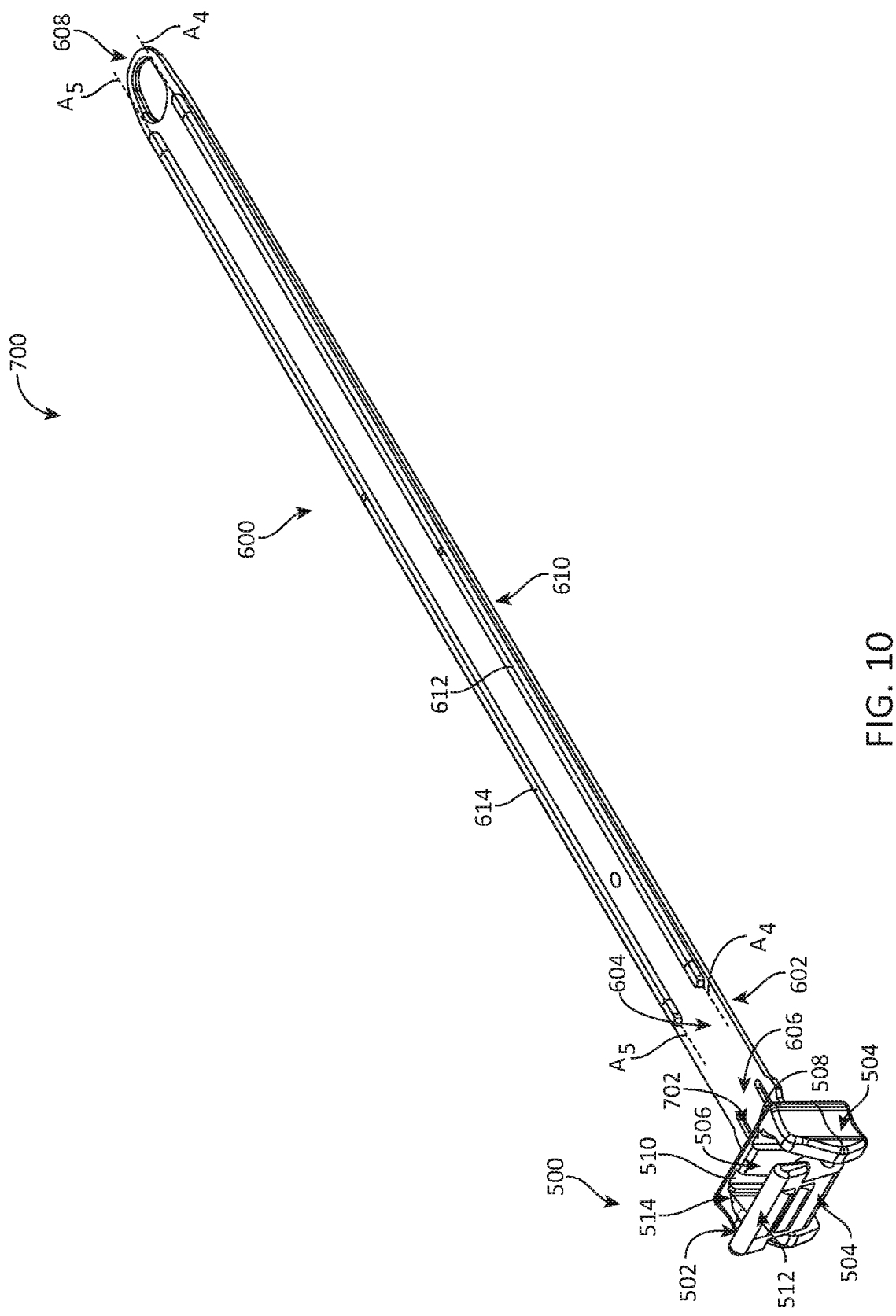
FIG. 10 illustrates a rear perspective view of a strap assembly, according to an embodiment.
Figure 11:
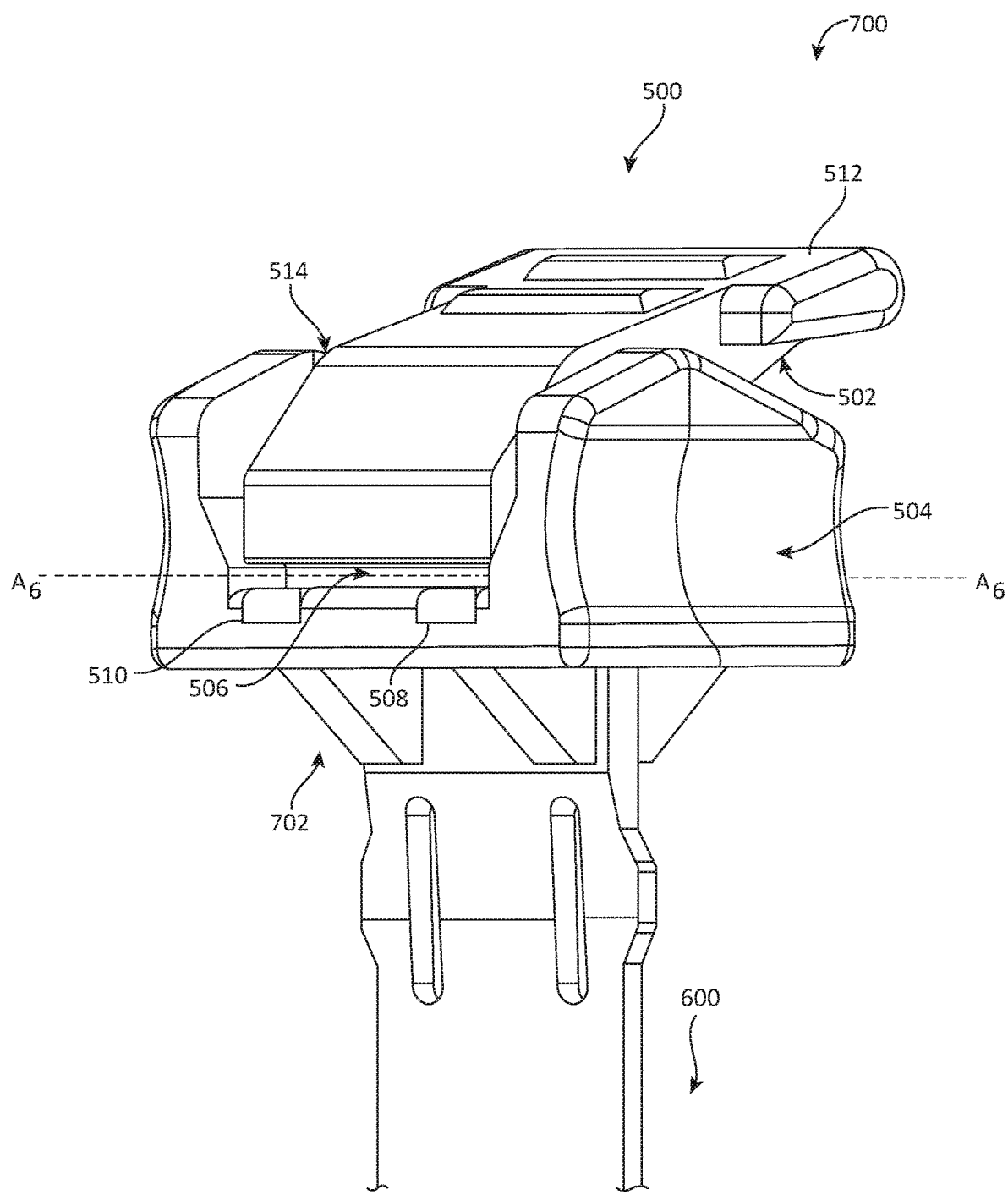
FIG. 11 illustrates a perspective view of a portion of a strap assembly, according to an embodiment.

In some embodiments, as shown, for example, in FIGS. 9-12, strap assembly 700 can include strap 600 with buckle 500 disposed at distal end 702 of strap assembly 700. Strap 600 is configured to engage buckle 500. In some embodiments, strap 600 and buckle 500 are configured to secure bicycle frame 120 to bicycle cradle 200, as shown, for example in FIGS. 13 and 14. In some embodiments, as shown, for example, in FIGS. 9 and 10, strap 600 can include first side 602, second side 604, first end 606, and second end 608. In some embodiments, buckle 500 can be disposed at first end 606. In some embodiments, first side 602 of strap 600 can be toothed. In some embodiments, as shown in FIG. 10, second side 604 of strap 600 can include first rail 612. For example, first rail 612 can extend along first rail axis A4. In some embodiments, as shown in FIG. 10, second side 604 of strap 600 can include second rail 614. For example, second rail 614 can extend along second rail axis A5. In some embodiments, first and second rails 612, 614 can be parallel. For example, first and second rails 612, 614 of strap 600 can extend through first and second grooves 508, 510, respectively, of buckle 500. In some embodiments, strap 600 can be made of a bendable material, for example, polymers (e.g., plastic, polytetrafluoroethylene, polyoxymethylene, phenolics, acetals, nylon, rubber, synthetic rubber, etc.) or other similar flexible machinable material.

Figure 12:
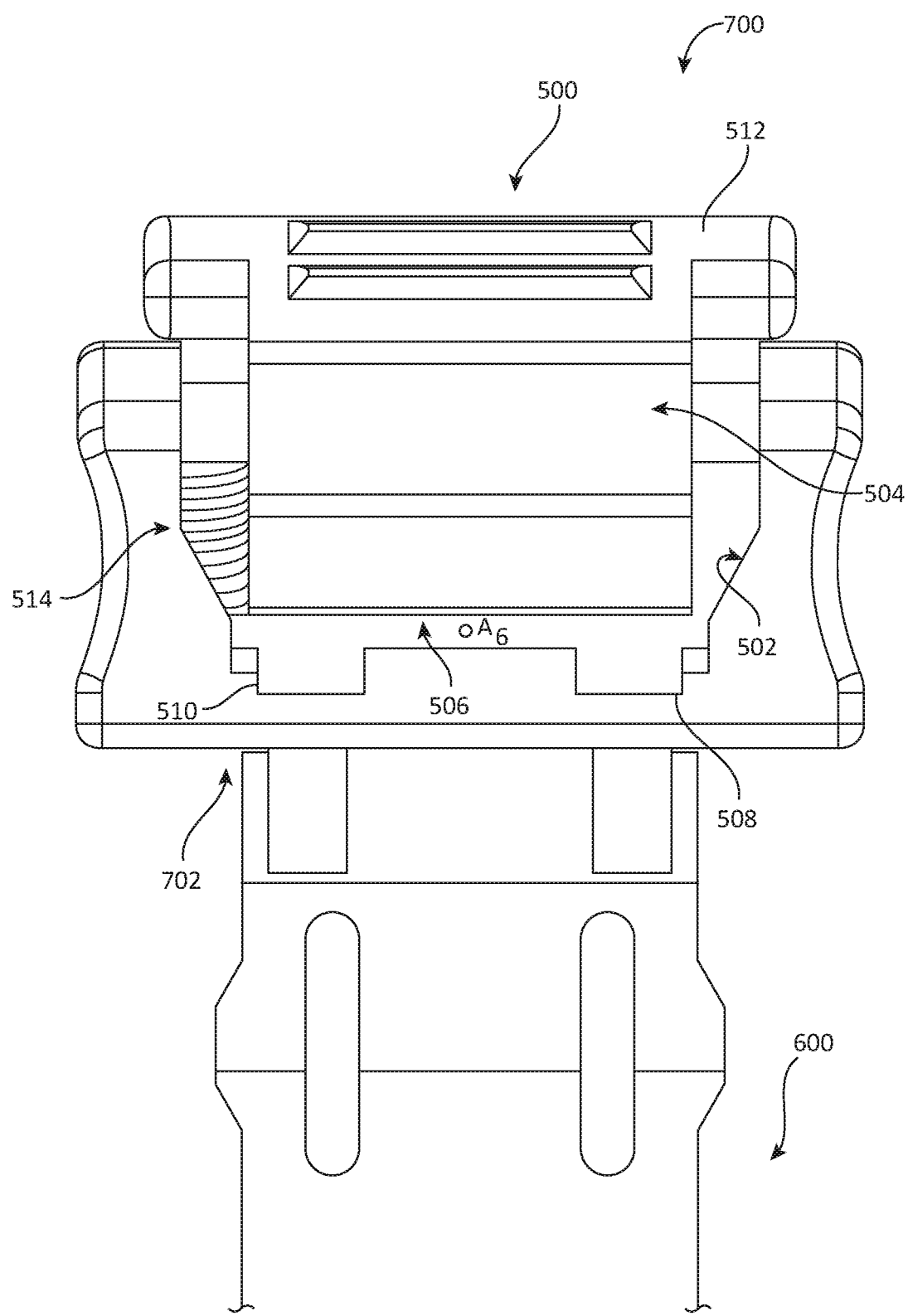
FIG. 12 illustrates a front view of a strap assembly, according to an embodiment.

In some embodiments, as shown, for example, in FIGS. 9-12, buckle 500 can include inner surface 502, outer surface 504, longitudinal slot 506, and tab 512. In some embodiments, as shown in FIG. 12, longitudinal slot 506 can extend through buckle 500 along longitudinal slot axis A6. In some embodiments, as shown, for example, in FIG. 12, longitudinal slot 506 can include first groove 508 and second groove 510. In some embodiments, as shown in FIG. 12, first and second grooves 508, 510 can have a quadrilateral cross-section. In some embodiments, longitudinal slot 506 can be configured to receive strap 600. For example, strap 600 can extend through longitudinal slot 506 of buckle 500, with first rail 612 and second rail 614 extending through first groove 508 and second groove 510, respectively. In some embodiments, as shown in FIGS. 10 and 12, tab 512 of buckle 500 can be spring-loaded. For example, buckle 500 can include spring 514 configured to apply a spring force to tab 512. As strap 600 extends through buckle 500, first side 602 (e.g., toothed side) of strap 600 contacts and lifts tab 512 in an upward direction, compressing spring 514, which is then applied as a spring force in a downward direction as each tooth of strap 600 moves past tab 512. In this way, tab 512 of buckle 500 functions as a ratchet to secure and lock first side 602 of strap 600 in buckle 500. In some embodiments, buckle 500 can be made of a rigid material, for example, polymers (e.g., plastic, polytetrafluoroethylene, polyoxymethylene, phenolics, acetals, nylon, etc.), metals (e.g., aluminum, titanium, etc.), or other similar rigid machinable material.

In some embodiments, as shown, for example, in FIG. 1, one or more buckles 500 can be disposed on outer surface 204 of bicycle cradle 200. For example, buckles 500 can be disposed on opposite sides of bicycle cradle 200 on outer surface 204. In some embodiments, buckles 500 can be disposed on a portion of bicycle cradle 200 extending radially away from through hole 206, for example, near storage cavity 219.

Figure 6:
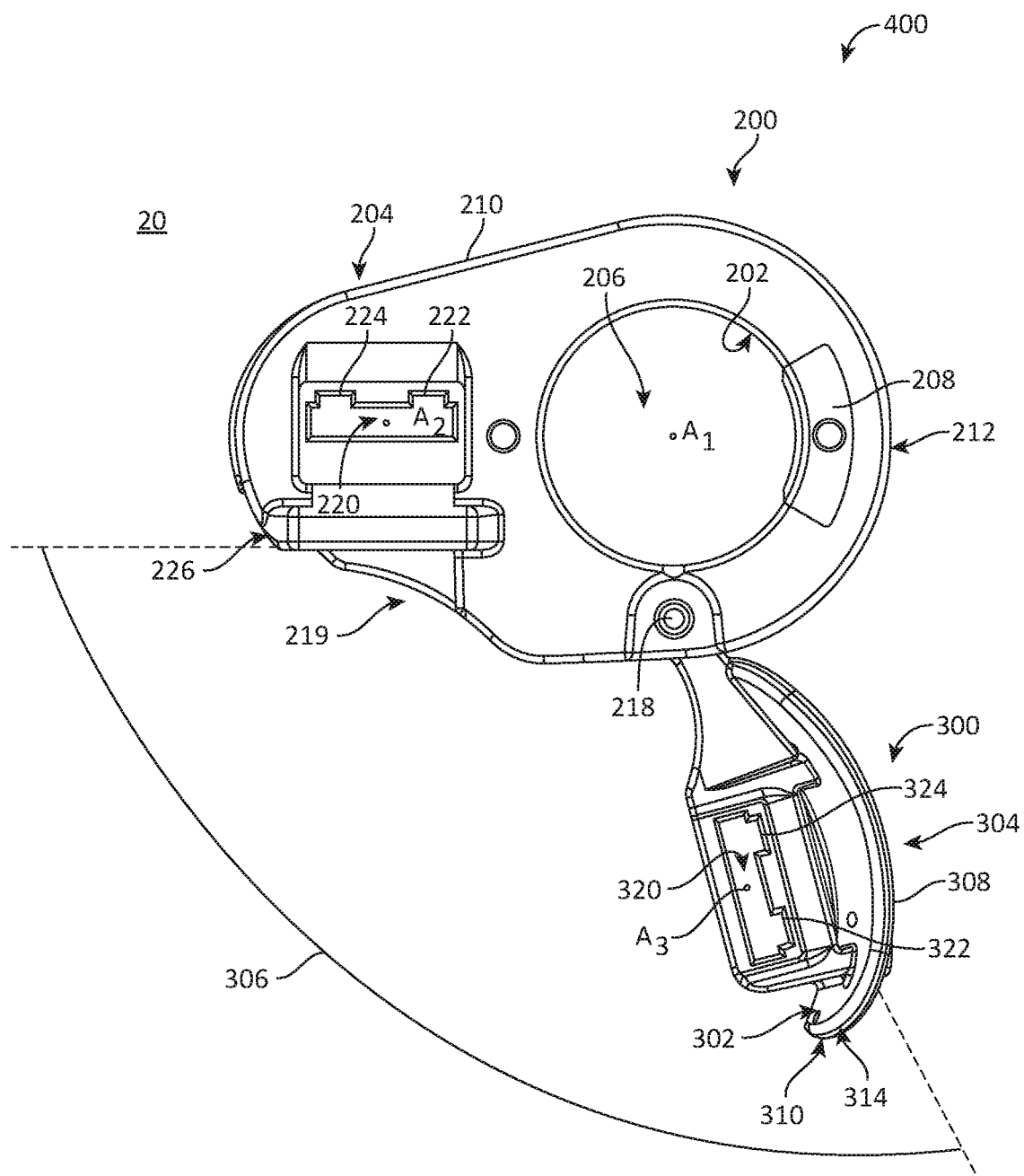
FIG. 6 illustrates a side view of an assembly in an unlocked configuration, according to an embodiment.
Figure 7:
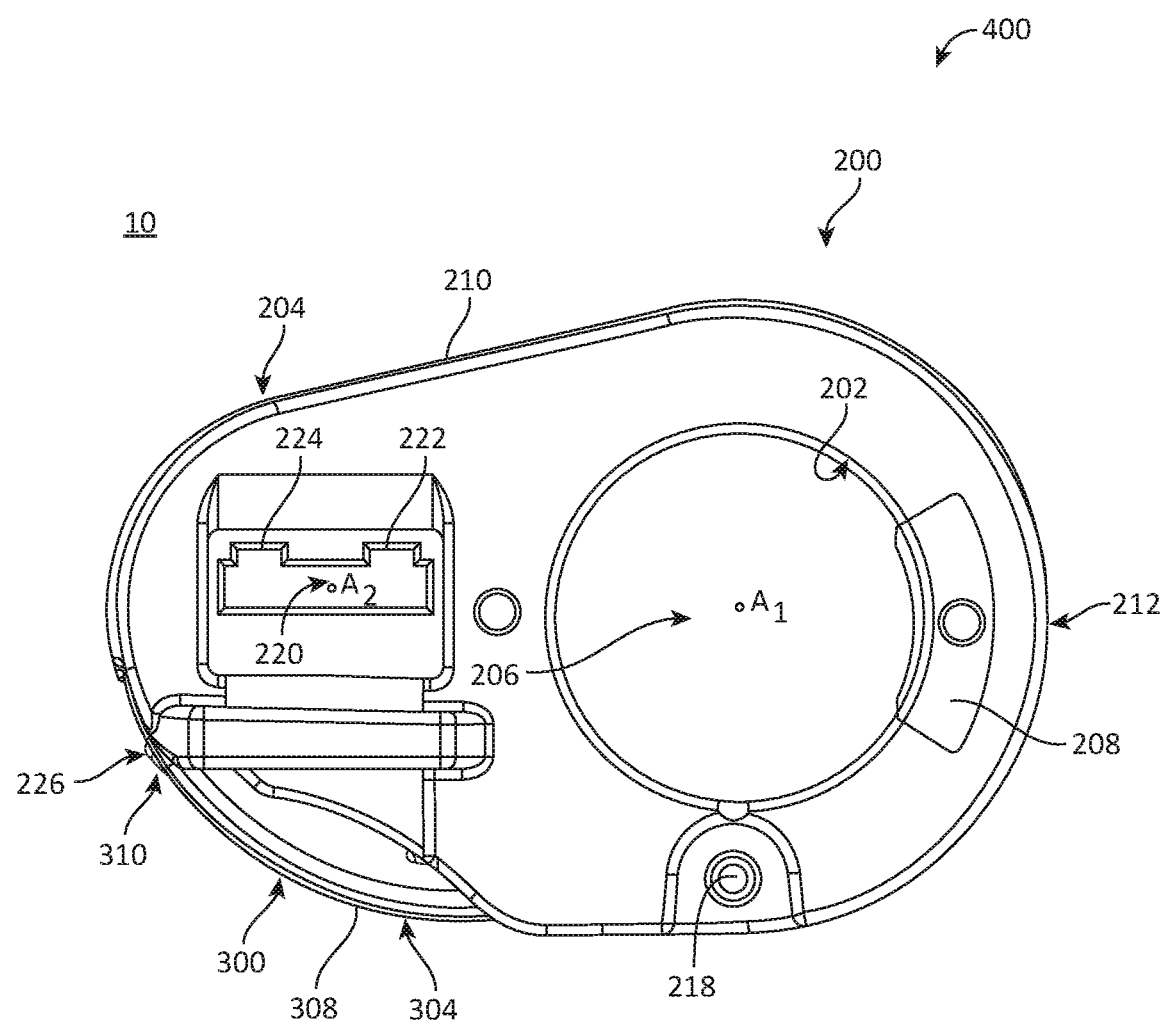
FIG. 7 illustrates a side view of an assembly in a locked configuration, according to an embodiment.

FIGS. 5-8 illustrate an embodiment of bicycle carrier 100 with assembly 400. In some embodiments, assembly 400 includes anti-sway member 300 coupled to bicycle cradle 200. For example, anti-sway member 300 can be coupled to bicycle cradle 200 by pin 218 such that anti-sway member 300 can rotate with respect to bicycle cradle 200. In some embodiments, as shown in FIG. 5, assembly 400 can be secured to bicycle carrier support arm 110. In some embodiments, as shown in FIG. 6, assembly 400 can be in an unlocked configuration 20 with anti-sway member 300 disposed away from storage cavity 219 of bicycle cradle 200. In some embodiments, as shown in FIG. 7, assembly 400 can be in a locked configuration 10 (also referred to as a storage configuration) with anti-sway member 300 disposed at least partially within storage cavity 219 of bicycle cradle 200. In some embodiments, anti-sway member 300 can be disposed entirely within storage cavity 219 of bicycle cradle 200. In both the locked configuration 10 and the unlocked configuration 20, a bicycle can be secured to assembly 400.

Figure 8:
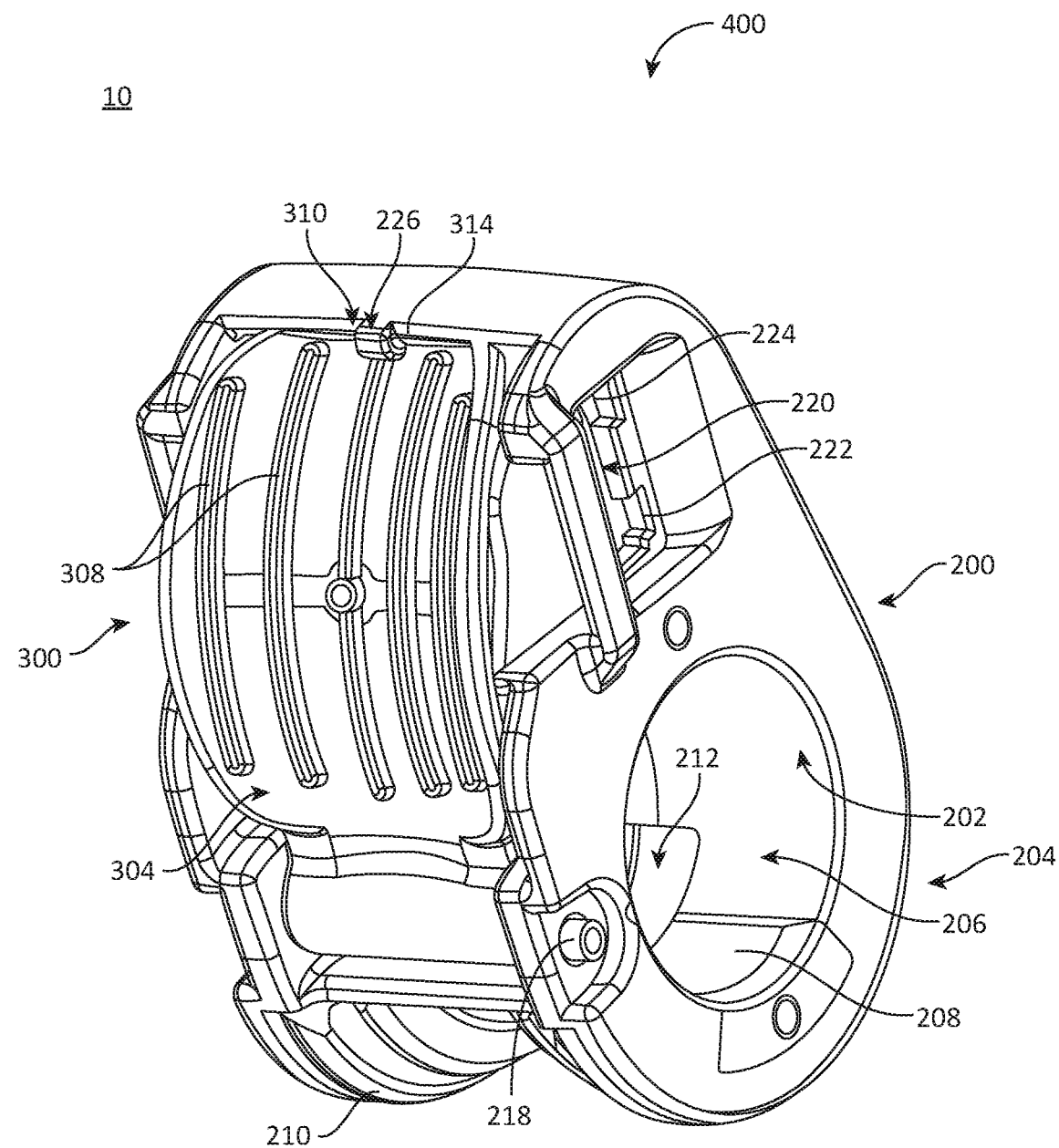
FIG. 8 illustrates a perspective view of the assembly of FIG. 7.

In some embodiments, anti-sway member 300 can be made of a rigid material, for example, polymers (e.g., plastic, polytetrafluoroethylene, polyoxymethylene, phenolics, acetals, nylon, etc.), metals (e.g., aluminum, titanium, etc.), or other similar rigid machinable material. Anti-sway member 300 is configured to reduce movement of a bicycle loaded onto bicycle carrier 100. In some embodiments, as shown, for example, FIG. 5, anti-sway member 300 can be concave. For example, anti-sway member 300 can be a hyperbolic paraboloid. As shown, for example, in FIGS. 5 and 6, anti-sway member 300 can include inner surface 302, outer surface 304, and locking mechanism 310. As shown, for example, in FIG. 7, locking mechanism 310 can be configured to secure anti-sway member 300 in locked configuration 10. In some embodiments, locking mechanism 310 includes snap-fit connection 314 disposed at an end of anti-sway member 300. In some embodiments, as shown in FIG. 8, locking mechanism 310 can include tab 226 of bicycle cradle 200, configured to mate with snap-fit connection 314 of anti-sway member 300.

In some embodiments, as shown in FIG. 5, outer surface 304 of anti-sway member 300 can include insert 308. For example, insert 308 can be a TPE disposed on a portion of outer surface 304. In some embodiments, insert 308 can be any material that increases the coefficient of friction between anti-sway member 300 and a bicycle frame, for example, a polymer or rubber material. In some embodiments, as shown in FIG. 5, insert 308 can extend outward from outer surface 304 and have one or more raised portions. In some embodiments, anti-sway member 300 can include a plurality of inserts 308 on outer surface 304. In some embodiments, insert 308 can be disposed on all of outer surface 304.

In some embodiments, anti-sway member 300 can be configured to rotate or pivot about pin 218 of bicycle cradle 200. For example, as shown in FIG. 6, anti-sway member 300 can rotate about 120 degrees along arc 306 about pin 218. In some embodiments, anti-sway member 300 can rotate about 90 degrees to about 150 degrees. In some embodiments, anti-sway member 300 can rotate about 100 degrees to about 140 degrees. In some embodiments, anti-sway member 300 can rotate about 120 degrees about pin 218 in order to contact a bicycle frame so that the bicycle frame can be secured to anti-sway member 300.

In some embodiments, as shown in FIG. 6, anti-sway member 300 can include transverse slot 320 that extends through anti-sway member 300 along transverse slot axis A3. In some embodiments, transverse slot axis A3 can be parallel to through hole axis A1 and/or transverse slot axis A2. As shown, for example, in FIG. 6, transverse slot 320 can include first groove 322 and optionally second groove 324. In some embodiments, as shown in FIG. 6, first and second grooves 322, 324 can have a quadrilateral cross-section. In some embodiments, transverse slot 320 can be configured to receive strap 600. In some embodiments, transverse slot 320 can be configured to receive strap assembly 700 with strap 600 and buckle 500. For example, strap 600 can extend through transverse slot 320 of anti-sway member 300, with first rail 612 and second rail 614 extending through first groove 322 and second groove 324, respectively.

Figure 13:
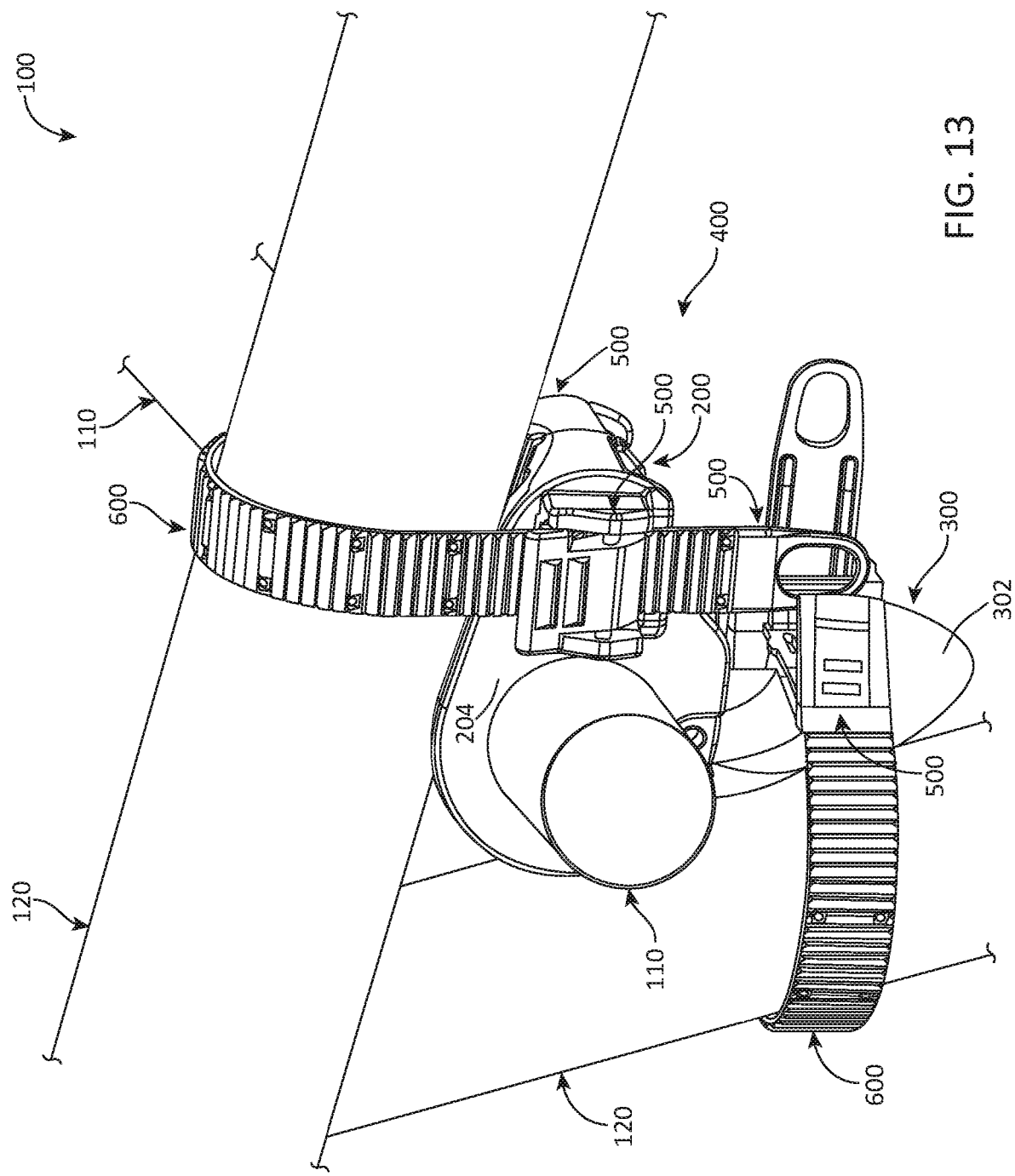
FIG. 13 illustrates a perspective view of a bicycle carrier with a secured bicycle frame, according to an embodiment.

FIGS. 13 and 14 illustrate embodiments of bicycle carrier 100 with bicycle frame 120 secured to bicycle carrier 100. In some embodiments, bicycle carrier 100 includes assembly 400 secured to bicycle carrier support arm 110.

In some embodiments, as shown in FIG. 13, bicycle cradle 200 can include buckles 500 configured to receive strap 600, and anti-sway member 300 can include buckles 500 configured to receive strap 600. In some embodiments, bicycle cradle 200 can include one or more buckles 500 disposed on outer surface 204 and configured to receive strap 600 to secure bicycle frame 120. In some embodiments, anti-sway member 300 can include one or more buckles 500 disposed on inner surface 302 (which includes a side of anti-sway member 300) and configured to receive strap 600 to secure bicycle frame 120. In some embodiments, bicycle frame 120 can be secured to bicycle cradle 200 and anti-sway member 300, with anti-sway member 300 in unlocked configuration 20, via respective strap 600 and buckles 500. In some embodiments, bicycle carrier 100 can be configured to reduce movement of bicycle frame 120 of a bicycle loaded onto bicycle carrier 100.

In some embodiments, as shown in FIG. 14, bicycle cradle 200 can include transverse slot 220 configured to receive strap assembly 700, and anti-sway member 300 can include transverse slot 320 configured to receive strap assembly 700. In some embodiments, bicycle cradle 200 can be configured to receive strap assembly 700 to secure bicycle frame 120. In some embodiments, anti-sway member 300 can be configured to receive strap assembly 700 to secure bicycle frame 120. In some embodiments, bicycle frame 120 can be secured to bicycle cradle 200 and anti-sway member 300, with anti-sway member 300 in unlocked configuration 20, via respective strap assembly 700. In some embodiments, bicycle carrier 100, with one or more strap assemblies 700, can be configured to reduce movement of bicycle frame 120 of a bicycle loaded onto bicycle carrier 100.

Methods of securing a bicycle to a bicycle carrier can be accomplished according to the manners of operation disclosed herein. In some embodiments, anti-sway member 300 of assembly 400 can be disposed in unlocked configuration 20. In some embodiments, this can be accomplished by the user applying enough force to anti-sway member 300 in locked configuration 10 to overcome locking mechanism 310, for example, snap-fit connection 314 of anti-sway member 300 and tab 226 of bicycle cradle 200, to move anti-sway member 300 to unlocked configuration 20.

In some embodiments, a method of securing bicycle frame 120 to bicycle carrier 100 includes loading bicycle frame 120 on bicycle cradle 200, and securing strap 600 coupled to bicycle cradle 200 around bicycle frame 120 disposed on bicycle cradle 200. In some embodiments, the method includes connecting bicycle cradle 200 to bicycle carrier support arm 110 by coupling fastener 214 to bicycle carrier support arm 110 through slot 212 through a portion of outer surface 204 of bicycle cradle 200. In some embodiments, securing strap 600, for example, part of strap assembly 700, includes disposing strap 600 through transverse slot 220 of bicycle cradle 200. In some embodiments, securing strap 600 includes extending strap 600 through buckle 500. For example, buckle 500 can be disposed on bicycle cradle 200 or buckle 500 can be part of strap assembly 700 extending through bicycle cradle 200. In some embodiments, the method further includes securing bicycle frame 120 to anti-sway member 300 coupled to bicycle cradle 200 and securing strap 600 coupled to anti-sway member 300 around bicycle frame 120. In some embodiments, securing strap 600, for example, part of strap assembly 700, includes disposing strap 600 through transverse slot 320 of anti-sway member 300. In some embodiments, securing strap 600 coupled to anti-sway member 300 includes disposing strap 600 through buckle 500. For example, buckle 500 can be disposed on anti-sway member 300 or buckle 500 can be part of strap assembly 700 extending through anti-sway member 300.

It is to be appreciated that the Detailed Description section, and not the Brief Summary and Abstract sections, is intended to be used to interpret the claims. The Summary and Abstract sections may set forth one or more but not all exemplary embodiments of load carriers, bicycle carriers, assemblies for bicycle carriers, bicycle cradles, anti-sway members, and strap assemblies as contemplated by the inventors, and thus, are not intended to limit the present embodiments and the appended claims in any way.

The present disclosure has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present disclosure should not be limited by any of the above-described exemplary embodiments, but should be defined only in accordance with the following claims and their equivalents.

What is claimed is:

1. A bicycle carrier, comprising:
a bicycle cradle comprising:
a through hole defining an inner surface, wherein the through hole is configured to receive a bicycle carrier support arm disposed therethrough; and
a slot through a portion of an outer surface of the bicycle cradle and a portion of the inner surface, wherein the slot is configured to allow a fastener to be coupled to the bicycle carrier support arm,
wherein the through hole and the slot are orthogonal to each other,
wherein the slot is a radial slot extending at least about 60 degrees along the outer surface of the bicycle cradle, and
wherein the radial slot is configured to allow the bicycle cradle to rotate about the bicycle carrier support arm when the fastener is disposed in the radial slot.

2. The bicycle carrier of claim 1, wherein the radial slot extends about 90 degrees along the outer surface of the bicycle cradle and is configured to allow the bicycle cradle to rotate about 90 degrees about the bicycle carrier support arm when the fastener is disposed in the radial slot.

3. The bicycle carrier of claim 1, further comprising an anti-sway member coupled to the bicycle cradle.

4. The bicycle carrier of claim 3, wherein the anti-sway member is pivotably coupled to the bicycle cradle by a pin.

5. An assembly for a bicycle carrier, comprising:
a bicycle cradle comprising a storage cavity; and
an anti-sway member coupled to the bicycle cradle and configured to secure a bicycle frame loaded onto the bicycle carrier,
wherein the anti-sway member is configured to be disposed at least partially within the storage cavity of the bicycle cradle in a storage configuration, and
wherein the bicycle cradle comprises a locking mechanism configured to secure the anti-sway member in the storage configuration.

6. The assembly of claim 5, wherein the anti-sway member is pivotably coupled to the bicycle cradle by a pin.

7. The assembly of claim 5, wherein in the storage configuration a majority of the anti-sway member is disposed within the storage cavity.

8. The assembly of claim 5, further comprising a transverse slot through the anti-sway member configured to receive a strap.

9. A bicycle carrier, comprising:
a bicycle cradle comprising:
a through hole defining an inner surface, wherein the through hole is configured to receive a bicycle carrier support arm disposed therethrough, and
a transverse slot through the bicycle cradle;
a first strap configured to extend through the transverse slot of the bicycle cradle and around a bicycle frame disposed on the bicycle cradle;
an anti-sway member coupled to the bicycle cradle and configured to reduce movement of a bicycle loaded onto the bicycle carrier, the anti-sway member comprising a transverse slot through the anti-sway member; and
a second strap configured to extend through the transverse slot of the anti-sway member and around a bicycle frame disposed on the anti-sway member,
wherein the transverse slot of the bicycle cradle is disposed below an outer surface of the bicycle cradle configured to support the bicycle frame,
wherein the transverse slot of the bicycle cradle comprises a first groove and the first strap comprises a first rail disposed on a first side of the first strap,
wherein the first rail of the first strap is configured to extend through the first groove of the transverse slot of the bicycle cradle,
wherein the transverse slot of the anti-sway member comprises a first groove and the second strap comprises a first rail disposed on a first side of the second strap, and
wherein the first rail of the second strap is configured to extend through the first groove of the transverse slot of the anti-sway member.

10. The bicycle carrier of claim 9, wherein the anti-sway member is pivotably coupled to the bicycle cradle by a pin.

11. The bicycle carrier of claim 9, wherein the transverse slot of the bicycle cradle comprises a second groove and the first strap comprises a second rail disposed on the first side of the first strap, wherein the second rail is configured to extend through the second groove, and wherein the second rail is parallel to the first rail.

12. The bicycle carrier of claim 9, wherein the first strap includes a first buckle disposed at a first end of the first strap and configured to receive and secure a toothed side of the first strap.

13. The bicycle carrier of claim 12, wherein the first buckle comprises a spring-loaded tab.

14. The bicycle carrier of claim 12, wherein the first buckle comprises a first groove and the first strap comprises a first rail disposed on a first side of the first strap, and wherein the first rail is configured to extend through the first groove of the first buckle.

15. An assembly for a bicycle carrier, comprising:
a bicycle cradle;
a buckle;
a strap configured to be coupled to the buckle;
an anti-sway member coupled to the bicycle cradle;
a second buckle; and
a second strap configured to be coupled to the second buckle,
wherein the buckle comprises a first groove and the strap comprises a first rail disposed on a first side of the strap,
wherein the first rail of the strap is configured to extend through the first groove of the buckle,
wherein the buckle comprises a spring configured to bias the buckle to the strap,
wherein the bicycle cradle comprises a transverse slot comprising a first transverse groove extending through the bicycle cradle,
wherein the first rail of the strap extends through the first transverse groove of the bicycle cradle,
wherein the second buckle comprises a first groove and the second strap comprises a first rail disposed on a first side of the second strap,
wherein the first rail of the second strap is configured to extend through the first groove of the second buckle,
wherein the second buckle comprises a spring configured to bias the second buckle to the second strap,
wherein the anti-sway member comprises a transverse slot comprising a first transverse groove extending through the anti-sway member, and
wherein the first rail of the second strap extends through the first transverse groove of the anti-sway member.

16. The assembly of claim 15, wherein the buckle comprises a spring-loaded tab configured to secure a toothed side of the strap.

17. The assembly of claim 15, wherein the buckle comprises a second groove and the strap comprises a second rail disposed on the first side of the strap and parallel to the first rail, and wherein the second rail is configured to extend through the second groove of the buckle.

18. The assembly of claim 15, wherein the buckle is disposed at a distal end of the strap.

19. The assembly of claim 5, wherein the locking mechanism comprises a tab disposed at an edge of the storage cavity and configured to provide a releasable snap-fit connection with the anti-sway member.

20. The assembly of claim 15, wherein the transverse slot of the bicycle cradle comprises a second transverse groove and the strap comprises a second rail disposed on the first side of the strap and parallel to the first rail, and wherein the second rail of the strap is configured to extend through the second transverse groove of the bicycle cradle.

* * * * *